(12) United States Patent
Liu et al.

(10) Patent No.: US 7,586,927 B1
(45) Date of Patent: Sep. 8, 2009

(54) MULTISTAGE CASCADE ARBITER

(75) Inventors: Andy Liu, Fremont, CA (US); Ann Gui, Cupertino, CA (US)

(73) Assignee: Force 10 Networks, Inc., San Jose, CA (US)

( * ) Notice: Subject to any disclaimer, the term of this patent is extended or adjusted under 35 U.S.C. 154(b) by 972 days.

(21) Appl. No.: 10/704,218

(22) Filed: Nov. 4, 2003

(51) Int. Cl.
*H04L 12/28* (2006.01)

(52) U.S. Cl. .................. 370/408; 370/447; 370/461

(58) Field of Classification Search .................. None
See application file for complete search history.

(56) References Cited

U.S. PATENT DOCUMENTS

| | | | | |
|---|---|---|---|---|
| 5,053,942 | A * | 10/1991 | Srini | 710/317 |
| 5,404,540 | A * | 4/1995 | Dike | 710/244 |
| 6,157,989 | A * | 12/2000 | Collins et al. | 711/151 |
| 6,487,213 | B1 * | 11/2002 | Chao | 370/418 |
| 6,862,328 | B2 * | 3/2005 | Motojima | 375/368 |
| 6,963,576 | B1 * | 11/2005 | Lee | 370/411 |
| 7,158,510 | B1 * | 1/2007 | Golla et al. | 370/374 |
| 2002/0176431 | A1 * | 11/2002 | Golla et al. | 370/412 |
| 2003/0174701 | A1 * | 9/2003 | Angle et al. | 370/390 |

* cited by examiner

*Primary Examiner*—Jayanti K Patel
*Assistant Examiner*—Jung Park
(74) *Attorney, Agent, or Firm*—Robert Schuler

(57) ABSTRACT

Multiple comparators compare the enable and priority values for multiple inputs and select a winner from one of the inputs. Multiple comparator stages each include one or more of the comparators. Each comparator stage selects winners from the outputs of a preceding comparator stage. The overall winners are those inputs that are winners in each comparator stage. If there are multiple overall winners, a second arbitration is preformed to identify an ultimate winner.

9 Claims, 4 Drawing Sheets

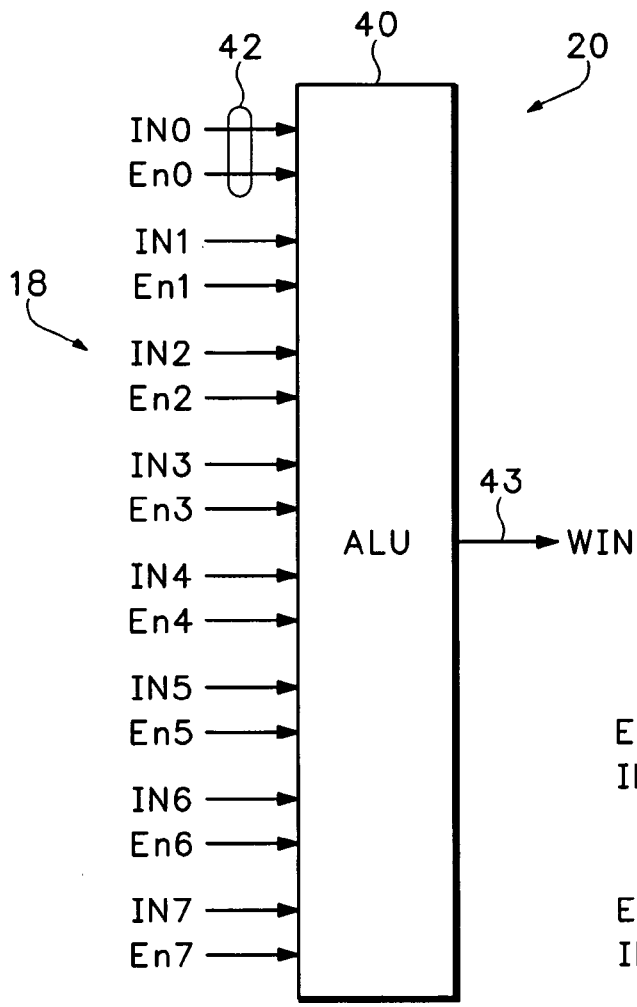
FIG.2
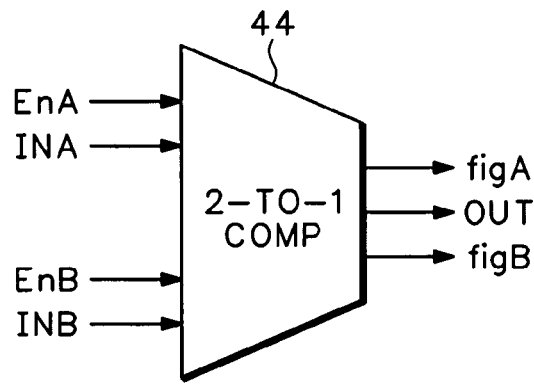
FIG.3
| EnA | Enb | INA>INB | INA<INB | INA=INB | figA | figB | OUT |
|---|---|---|---|---|---|---|---|
| 0 | 0 | X | X | X | 0 | 0 | INA |
| 0 | 1 | X | X | X | 0 | 1 | INB |
| 1 | 0 | X | X | X | 1 | 0 | INA |
| 1 | 1 | 1 | 0 | 0 | 1 | 0 | INA |
| 1 | 1 | 0 | 1 | 0 | 0 | 1 | INB |
| 1 | 1 | 0 | 0 | 1 | 1 | 1 | INA |
NOTE: 1 MEANS TRUE OR ACTIVE
0 MEANS FALSE OR INACTIVE
X MEANS DON'T CARE
FIG.4

MULTISTAGE CASCADE ARBITER

BACKGROUND OF THE INVENTION

A network processing device, such as a router or switch, receives packets at multiple input ports. The network processing device receives these incoming packets at the input ports and routes the packets to appropriate destinations through corresponding output ports. Headers in the packets identify which output ports should be used for transmitting the packets. The incoming packets from the input ports are temporarily stored in buffers until the appropriate output ports are ready to forward the packets toward the appropriate destination addresses. It is desirable to route these packets as quickly and efficiently as possible to the corresponding output ports.

Problems arise when multiple input ports request access to the same output ports at the same time. If one input port continuously has high priority or high weight packets (large number of bytes), lower priority or lower weight packets (small number of bytes) have to wait long periods of time before gaining access to the targeted output port. Different arbitration schemes are used to determine what order the packets at input ports are granted access the different output ports. Present arbitration schemes do not fairly and efficiently arbitrate among the requesting input ports.

The present invention addresses this and other problems associated with the prior art.

SUMMARY OF THE INVENTION

Multiple comparators compare the enable and priority values for multiple inputs and select a winner from one of the inputs. Multiple comparator stages each include one or more of the comparators. Each comparator stage selects winners from the outputs of a preceding comparator stage. The overall winners are those inputs that are winners in each comparator stage. If there are multiple overall winners, a second arbitration is preformed to identify an ultimate winner.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 2 is a diagram of the ALU used in FIG. 1.

FIG. 3 is a diagram of a 2-to-1 comparator used in the ALU shown in FIG. 2.

FIG. 4 is a diagram of a truth table used by the comparator shown in FIG. 3.

DETAILED DESCRIPTION

Figure 1:
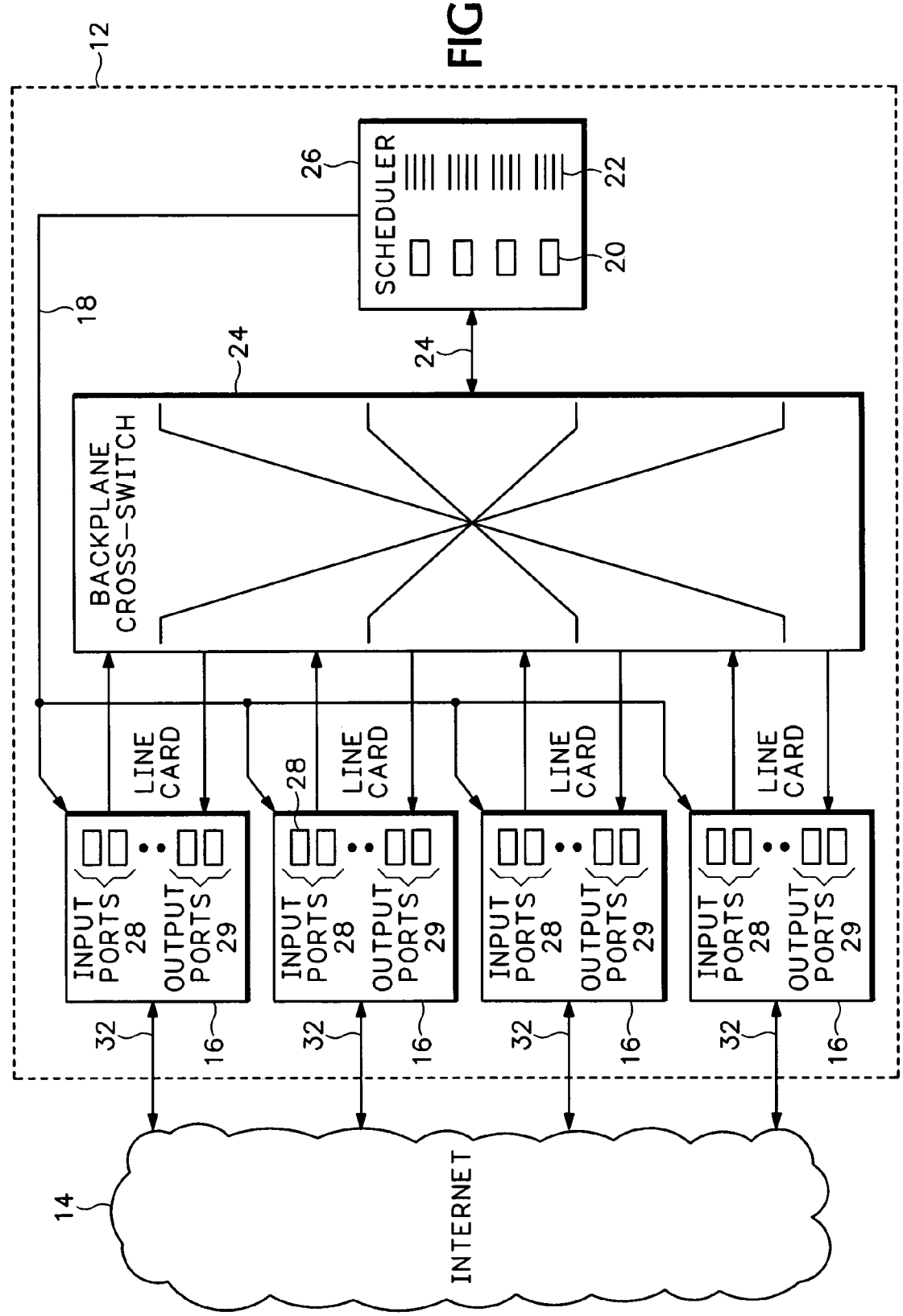
FIG. 1 is diagram of a network processing device that uses an Arithmetic Logic Unit (ALU) for arbitration.

FIG. 1 shows a network processing device 12 connected to an Internet network 14. Multiple connections 32 couple the network processing device 12 to the Internet 14. The different connections 32 are connected to different routing locations in Internet 14. The connections 32 are coupled to Line Interface Cards (LICs) 16. The LICs 16 each receive packets over the Internet 14 at input ports 28 and then request grants from scheduler 26 to send the received packet to output ports 29 for routing to different destination addresses.

When one of the input ports 28 receives one or more packets, that input port 28 makes a request over control bus 18 to scheduler 26 to send the packets over a back plane cross switch 24 to a particular one of the output ports 29. The scheduler 26 includes arbiters 20 for each output port 29. Separate output port arbitrations are conducted for each output port 29 by a different arbiter 20. The arbiters 20 each conduct an output port arbitration for all of the input ports 28 requesting the same output port 29. The scheduler 26 sends back a grant signal over control bus 18 to the particular input port 28 winning the output port arbitration.

Each input port has a group of associated Virtual Output Queues (VOQs) 22. One VOQ for each input port 28 is dedicated to a different output port 29. Multiple grants may be received for multiple VOQs for the same input port. A second input port arbitration is conducted when multiple VOQs 22 for the same input port 28 receive grants from different output ports 29. The arbiters 20 in scheduler 26 select one of the granted VOQs for the input port 28 to win the input port arbitration. The winning VOQ 22 sends an accept signal back to the granting arbiter 20. Any grants that are not accepted go through another arbitration iteration. This arbitration scheme is repeated until convergence where no remaining unmatched output ports can be matched with any remaining unmatched input ports.

At the completion of a current time slot, the scheduler 26 reconfigures the cross switch 24 through control line 24 to connect the accepting input ports 28 to their granting output ports 29. A time slot is a predetermined amount of time allotted for sending packets from the input ports to the output ports. The input ports 28 then send packets identified in the VOQs to their connected output ports 29 during the next time slot. More detailed operation of the network processing device 12 is described in co-pending application entitled SCHEDULING AND ARBITRATION SCHEME FOR NETWORK PROCESSING DEVICE, filed on Sep. 28, 2000, Ser. No. 09/676,046 which is herein incorporated by reference.

Arbiter Arithmetic Logic Unit

Referring to FIG. 2, one embodiment of the network processing device 12 described in FIG. 1 uses Arithmetic Logic Units (ALU) 40 in the arbiters 20 for determining which input ports gain access to which output ports or to determine which output ports are allowed to transmit data over the internet 14. As described in the co-pending application Ser. No. 09/676, 046, there may be multiple arbiters 20 that individually operate for associated input or output ports 29. In this case, there may be one ALU 40 used in each arbiter 20.

The ALU 40 provides the compare and arbitration logic used for picking the winning input or output port from all of the contending ports. Those port contenders are represented at the input of the ALU 40 through the control bus 18. Within bus 18 are individual input buses 42 that each carry a weight value and a corresponding enable signal for a particular port. For example, the individual control bus 42 carries the priority value and enable signal for port 1.

FIG. 2 shows the inputs and outputs for an 8-to-1 ALU where IN0, IN1, . . . IN7 indicate the individual buses for ports 0-7, respectively. The inputs En0, En1, . . . En7 indicate the enable signals for ports 0-7, respectively. An 8-bit WIN bus 43 indicates the winner of the arbitration. In one example, the enable signals En0-En7 are activated when associated ports 28 or 29 in FIG. 1 are enabled. The enable signals are set to zero when the associated ports 28 or 29 are disconnected or disabled.

In one example, the weight values IN0-IN7 vary according to an amount of data buffered at the associated input or output port 28 or 29. For example, there may be 4 bytes of data currently residing in an input port 28 associated with bus IN2 and 16 bytes of data currently residing in an input port 28 associated with bus IN5. In this example, IN5 would have a higher weight value than IN2.

Generation of the priority values on buses IN1, . . . IN7 and the enable signals En0, En1, . . . En7 are described in the co-pending application Ser. No. 09/676,046 which has been incorporated by reference. The technique used for generating the priority values and the enable signals is not of primary importance to the present invention and therefore will not be described in further detail. It is only necessary to understand that each device, whether a port or some other type of processing circuit, has an associated priority value and enable signal generated in the network processing device 12 that are supplied as inputs to the ALU 40. The ALU 40 can also be used in computing device that is not related to network processing.

Comparators

Referring to FIG. 3, the ALU 40 uses comparators 44 to pick the overall winner or winners and then uses a round-robin pointer to pick an ultimate winner. Multiple 2-to-1 comparators 44 are used as basic building blocks for generating the 8-to-1 comparator used in ALU 40 (FIG. 2). A truth table 46 for the 2-to-1 comparator 44 is shown in FIG. 4. Note that a "1" in table 46 means true or active, a "0" means false or inactive, and "X" means don't care.

Whenever output flgA is 1, the input bus A (INA) has been picked as the winner and whenever output flgB is 1, the input bus B (INB) has been picked as the winner. If both flgA and flgB are both 1 both input buses INA and INB have the same value and the output bus (OUT) can be either INA or INB. In this embodiment INA is output on the output bus OUT when input buses INA and INB have the same value.

8-to-1 Comparator

Figure 5:
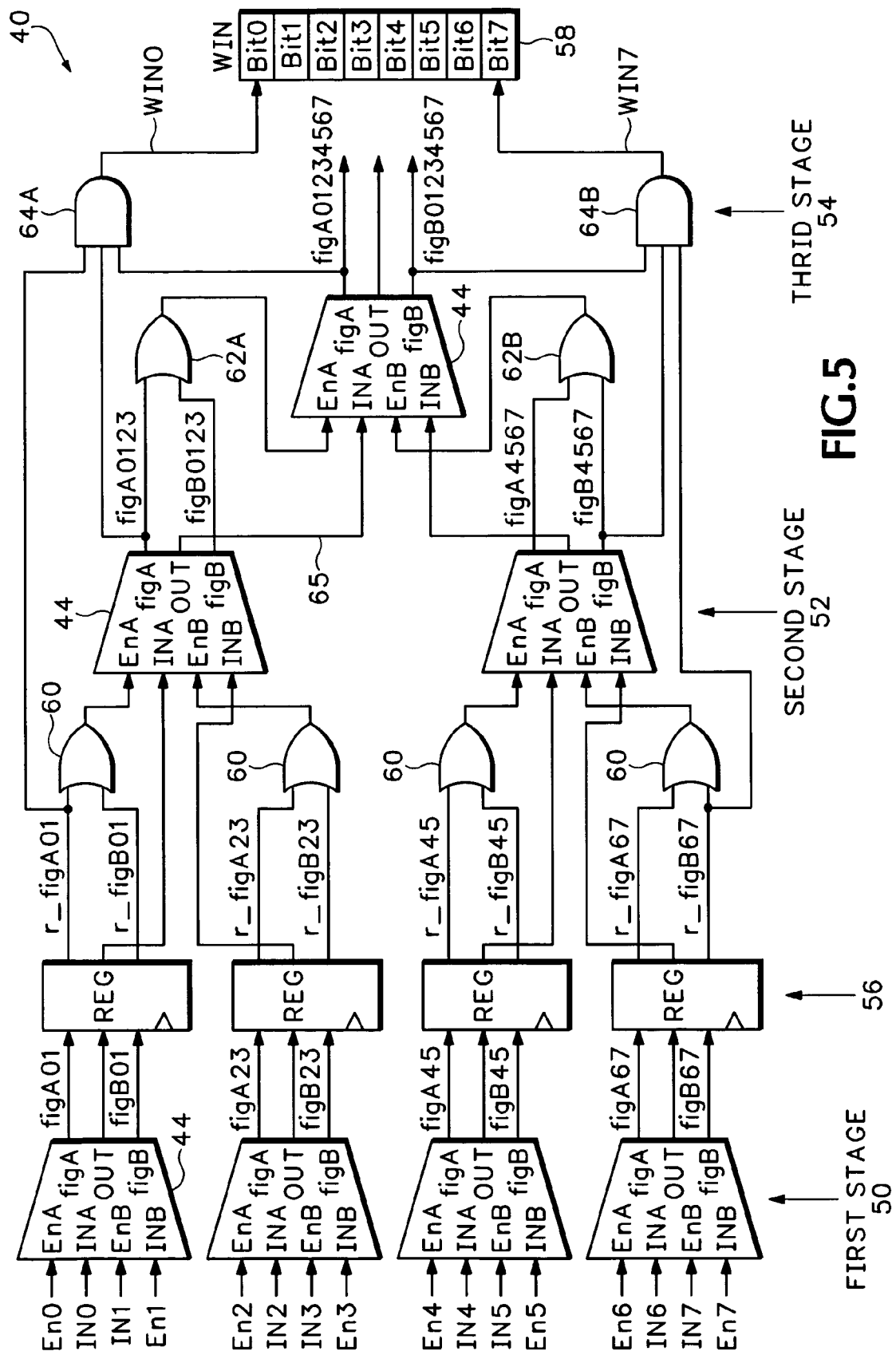
FIG. 5 is a diagram of an 8-to-1 comparator that uses the 2-to-1 comparators shown in FIG. 3.

Referring to FIG. 5, three stages 50, 52, and 54 of 2-to-1 comparators 44 are used to implement the 8-to-1 comparator 40. For timing delay consideration, registers 56 are used between a first stage 50 and a second stage 52 of comparators. A register 58 is used at the output of a third stage 54.

The enable inputs En0-En7 for the first stage 50 are controlled by logic in the scheduler 26 (FIG. 1). When one of the enable inputs En0-En7 is "1", the corresponding input bus IN0-IN7 is enabled to participate in a comparison in the first stage 50. When one of the enable inputs is "0", the corresponding input bus is disabled or disqualified from participating in the comparisons provided in the first stage 50.

The enable inputs for the second stage 52 of comparators are connected to OR gates 60 and the enable inputs for the third stage 54 of comparators are connected to OR gates 62 output of the second stage 52. For example, the OR gate 62A has inputs coupled to the flgA0123 and flgB0123 outputs and has an output coupled to the EnA input of the third stage comparator. This implies that either flgA0123 or flgB0123 has to be 1 in order for output 65 to qualify for the comparison in the third stage 54 comparator.

Register 58 has eight bits of data with each bit indicating the Win (when one) or Loss (when zero) for an associated one of the eight input buses IN1-IN7. For example, if Bit2 is one, the input IN2 is a winner.

For each WIN bit to have a value of 1, all of its corresponding flags in its path have to be is. For example, for WIN bit 0 (WIN0) to be one, flags flgA01, flgA0123 and flgA01234567 have to all be 1. For WIN bit 1 to be 1, flags flgB01, flgA0123 and flgA01234567 have to all be 1, etc. Logic AND gates 64 are associated with each WIN bit in the register 58. For example, the AND gate 64A receives the flags flgA01, flgA0123 and flgA01234567 as inputs and sets bit WIN0 to 1 when all three flags are 1.

Round-Robin Pointer

Figure 6:
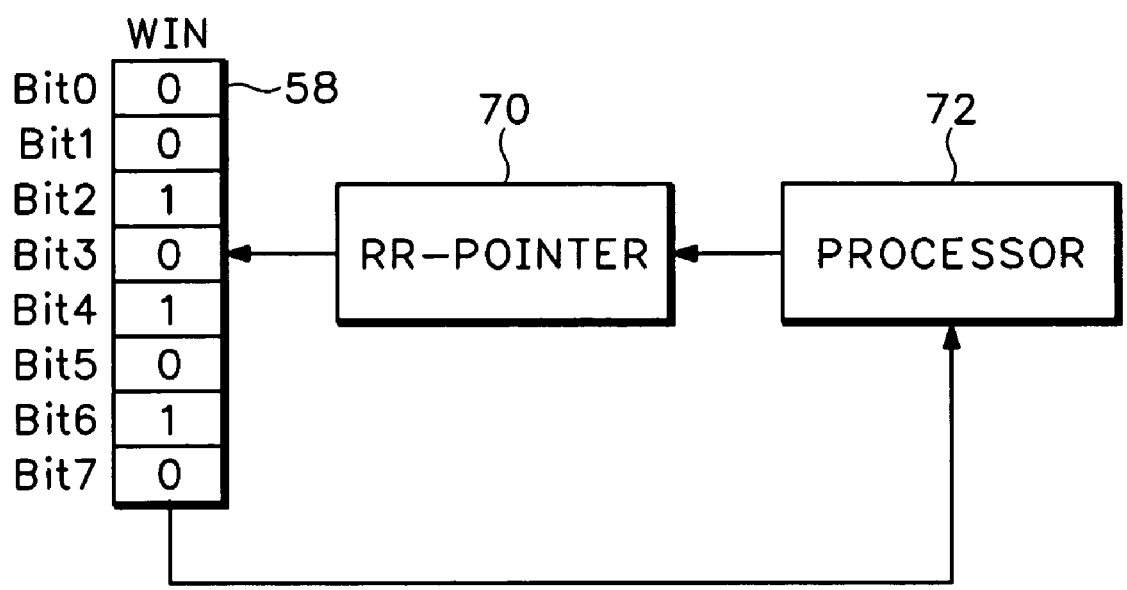
FIG. 6 is a diagram of a round robin pointer that is used in conjunction with the ALU.

There is a chance that the 8-to-1 comparator 40 in FIG. 5 can set multiple WIN bits to 1 indicating multiple winners with the same input values. A round-robin pointer is then used to select an ultimate winner. Referring to FIG. 6, a Round-Robin pointer (RR-pointer) 70 is controlled by a processor 72 in the network processing device 12 (FIG. 1). The value of the RR-pointer 70 indicates the location in register 58 with the highest priority to win.

For example, in FIG. 6 the Bit2, Bit4 and Bit6 bits in register 58 are all set to 1, indicating input busses IN2, IN4 and IN6 are all winners. The RR-pointer 70 currently points at the Bit3 location, corresponding to input bus 3. The position of the RR-pointer 70 indicates that Bit3 has the highest priority, Bit4 the second highest priority, then Bit5 . . . etc.

Since Bit3 is zero (loser), the next bit with a bit set to 1 is the ultimate winner, and in this case is Bit4 for input bus IN4. On the next run of arbitration after Bit4 or input bus IN4 is selected as the ultimate winner, the processor 72 increments the RR-pointer 70 to the value of "5" which indicate Bit5 will become the highest priority. In one example, the processor 72 increments the RR-pointer 70 for each time slot used for transferring data in the network processing device 12.

It should be understood that this is just one example, and any number of 2-to-1 comparators 44 (FIG. 3) can be used depending on the number of inputs for the ALU 40 (FIG. 2). For example, 30 or more inputs can be fed into the ALU 40. In this case, 15 or more 2-to-1 comparators 44 are used in the first stage 56 of the ALU 40 (FIG. 5).

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention can be modified in arrangement and detail without departing from such principles. I claim all modifications and variation coming within the spirit and scope of the following claims.

The invention claimed is:

1. An arbiter, comprising:
   a plurality of comparators each receiving a first enable input, a first priority input, a second enable input and a second priority input, the comparators comparing the first priority input with the second priority input and outputting one of the first priority input and second priority input as priority outputs according to the comparison and the first and second enable inputs;

the comparators generating output flags that indicate whether the first priority input and the second priority input were selected as the priority output;

the comparators arranged in multiple comparator stages each including one or more of the comparators, each subsequent comparator stage using the output flags from the preceding comparator stage at the first and second enable input and using the priority outputs from the preceding comparator stages as the first and second priority input; and a win register, coupled through logic circuitry to the output flags of the comparators in the comparator stages, that identifies winning priority inputs.

2. An arbiter according to claim 1 including logical OR gates receiving a first output flag and a second output flag from one of the comparators in the preceding comparator stage and generating outputs for feeding into the enable inputs for one of the comparators in the subsequent comparator stage.

3. An arbiter according to claim 1 including a round-robin pointer that selects between multiple winning priority inputs.

4. An arbiter according to claim 1 wherein the priority inputs are associated with priority values assigned to buffers in a network processing device.

5. An arbiter according to claim 1 wherein the output flags indicate no winning priority output when both the first and second priority inputs are disabled.

6. A logic unit, comprising:

an input comparator stage including multiple comparators each receiving enable and priority values associated with two or more circuit elements, the comparators each conducting individual arbitrations and generating win indicators identifying the circuit elements winning the individual arbitrations and outputting priority values for the winning circuit elements;

at least one intermediate comparator stage including multiple comparators that each make individual arbitrations according to the win indicators and priority values output from two or more individual arbitrations from the input comparator stage;

a final comparator stage including one or more comparators that each make individual arbitrations according to the win indicators and priority values output from two or more individual arbitrations from the at least one intermediate comparator stage; and a win register that indicates which of the circuit elements are overall winners for all of the comparator stages.

7. A logic unit according to claim 6 including a round robin circuit that selects one of the overall winners indicated in the win register as an ultimate winner.

8. A logic unit according to claim 6 wherein the win indicator identifies a multiple winner condition where multiple ones of the priority values the in one of the individual arbitrations.

9. A logic unit according to claim 6 wherein the win indicator for one of the comparators identifies a no-win condition when all priority values input to the comparator are disabled.

* * * * *